(12) United States Patent
Ina et al.

(10) Patent No.: US 7,951,038 B2
(45) Date of Patent: May 31, 2011

(54) POWER TRANSMITTING APPARATUS

(75) Inventors: Hideaki Ina, Shizuoka (JP); Naoyuki Miwa, Shizuoka (JP); Takayuki Suzuki, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 632 days.

(21) Appl. No.: 12/119,411

(22) Filed: May 12, 2008

(65) Prior Publication Data

US 2008/0280720 A1 Nov. 13, 2008

(30) Foreign Application Priority Data

May 10, 2007 (JP) ................. 2007-125358

(51) Int. Cl.
*B60K 23/08* (2006.01)
(52) U.S. Cl. ......... 475/231; 180/247; 180/248; 180/249
(58) Field of Classification Search .................. 475/231; 403/410; 180/247–250
See application file for complete search history.

(56) References Cited

U.S. PATENT DOCUMENTS

| | | | | |
|---|---|---|---|---|
| 3,522,861 A | * | 8/1970 | Knapp et al. ................. | 180/243 |
| 5,429,221 A | * | 7/1995 | Tanzer ....................... | 192/85.57 |
| 6,935,982 B2 | | 8/2005 | Handa et al. | |
| RE39,054 E | | 4/2006 | Kagata et al. | |
| 7,086,978 B2 | * | 8/2006 | Aikawa et al. .................... | 475/5 |

FOREIGN PATENT DOCUMENTS

| | | |
|---|---|---|
| JP | 3521945 | 7/1995 |
| JP | H-10-297313 | 11/1998 |
| JP | 2001-080385 | 3/2001 |
| JP | 2003-191768 | 7/2003 |
| JP | 2005-324719 | 11/2005 |
| WO | WO93/21462 | 10/1993 |

* cited by examiner

*Primary Examiner* — Tisha D Lewis
(74) *Attorney, Agent, or Firm* — Knobbe, Martens, Olson & Bear, LLP

(57) ABSTRACT

A power transmitting apparatus for performing switching between 2-wheel and 4-wheel drive modes and locking and unlocking of a differential by an operational shaft can comprise a reversible motor, a driving shaft rotationally driven by the motor and adapted to be engaged by the operational shaft for transmitting a rotational force therebetween, a sub case for containing the motor and the driving shaft therein and mounted on the main case, an opening formed in the sub case and having a size permitting the operational shaft to be inserted and an end face of the driving shaft for engaging an end face of the operational shaft to be exposed, and a first sealing arranged on the inner circumferential surface of the opening at a position away from the driving shaft for sealing off the inside of the sub case with forming a seal between the inner circumferential surface of the opening and the outer circumferential surface of the operational shaft when the operational shaft is engaged with the driving shaft.

12 Claims, 11 Drawing Sheets

[Fig. 1]
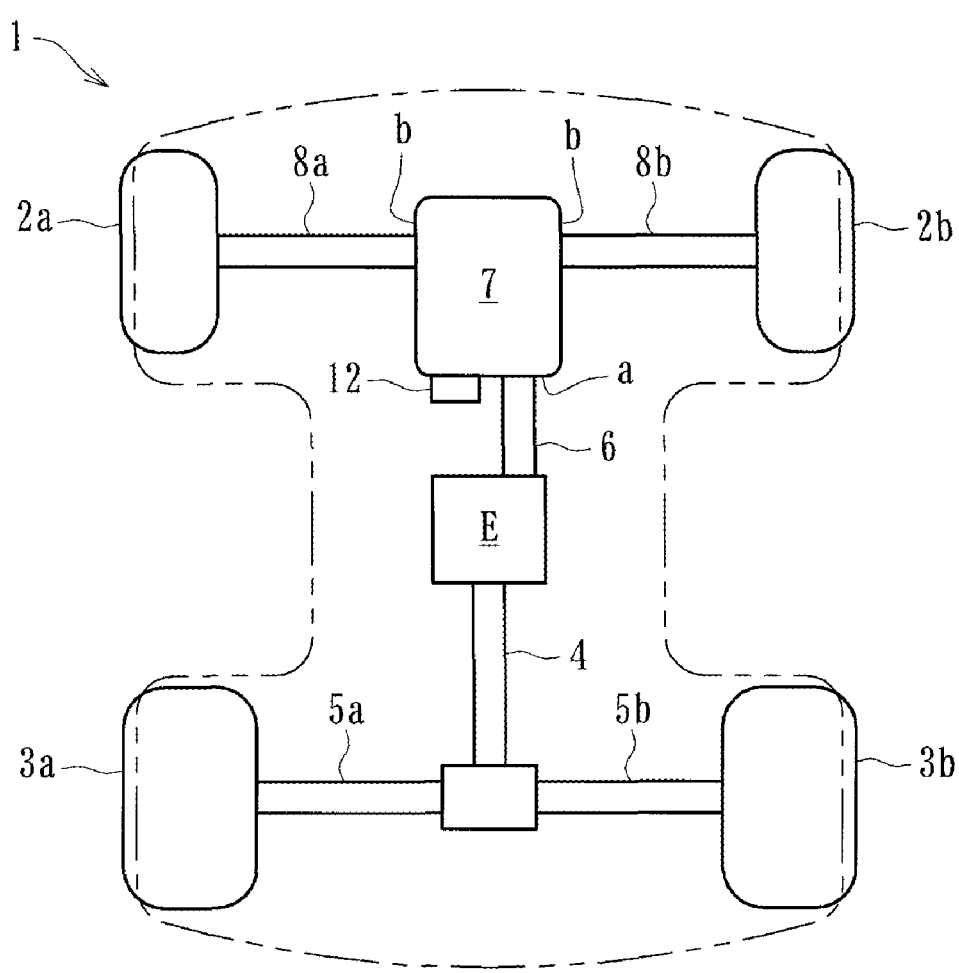

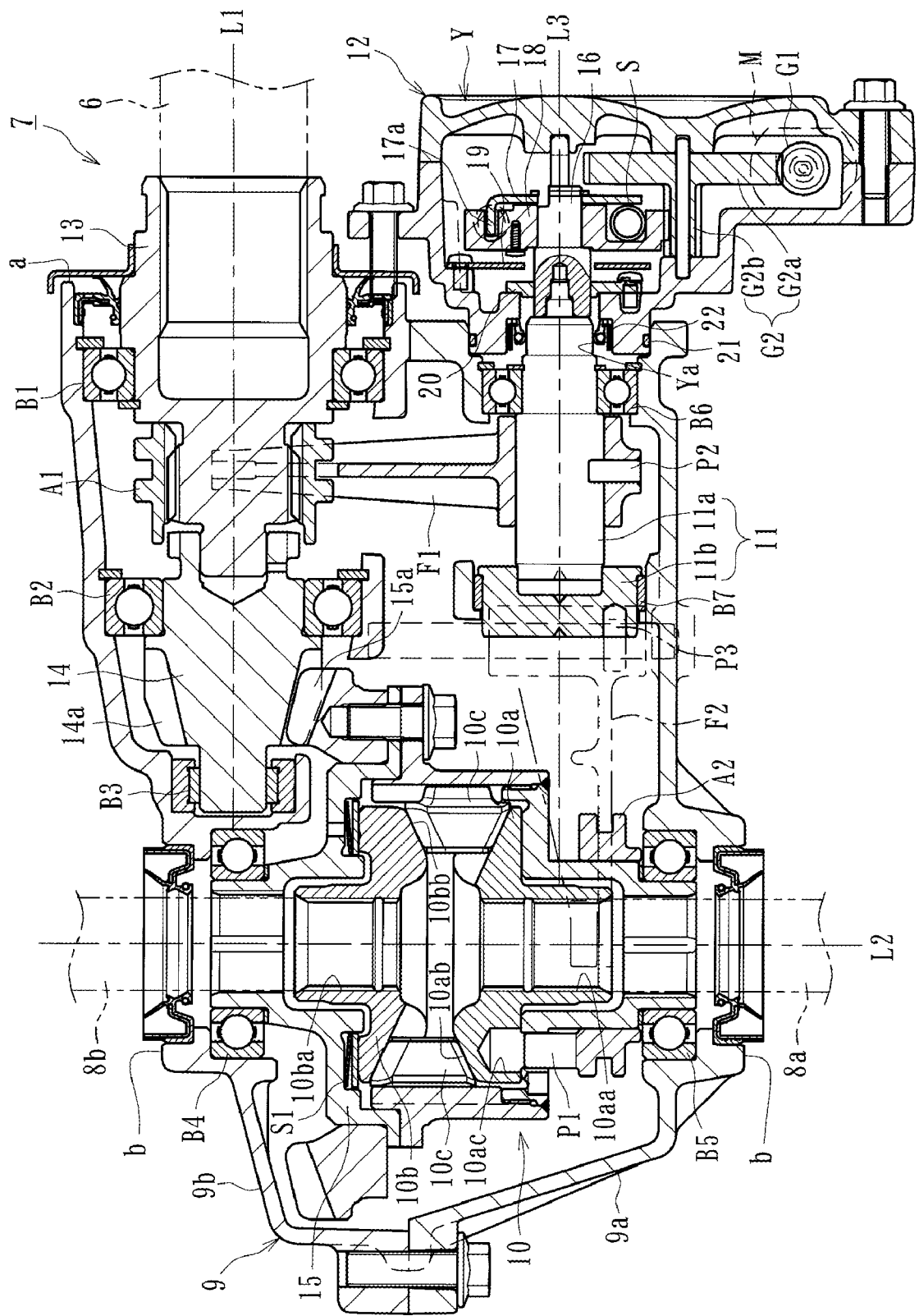
[Fig. 2]

[Fig. 3]
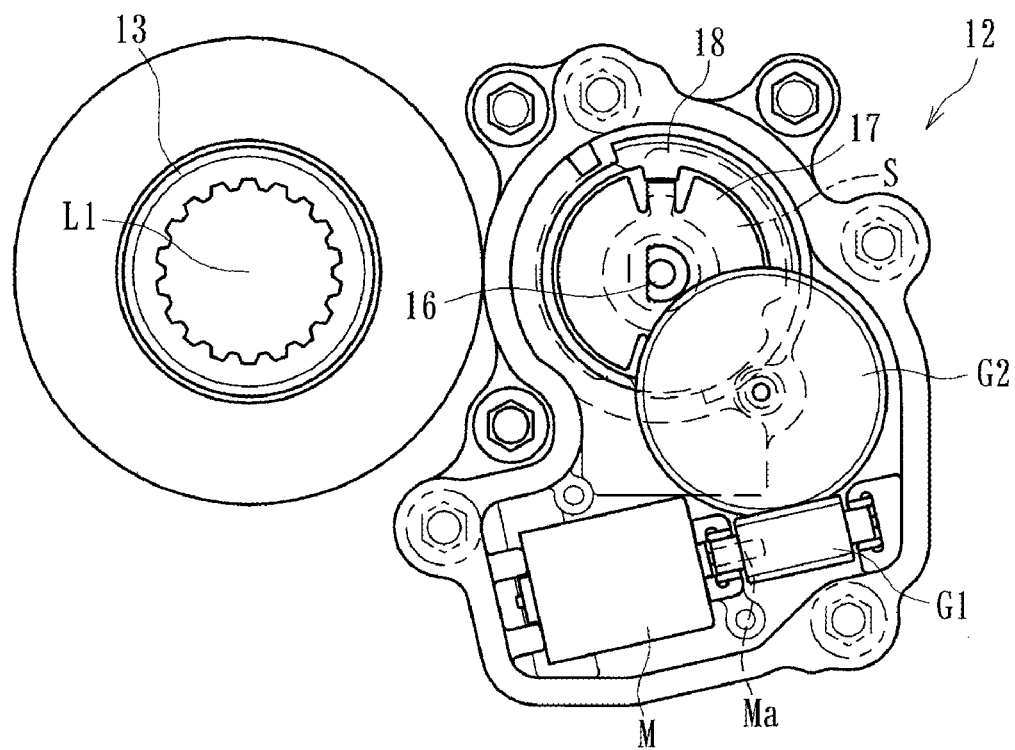

[Fig. 4]
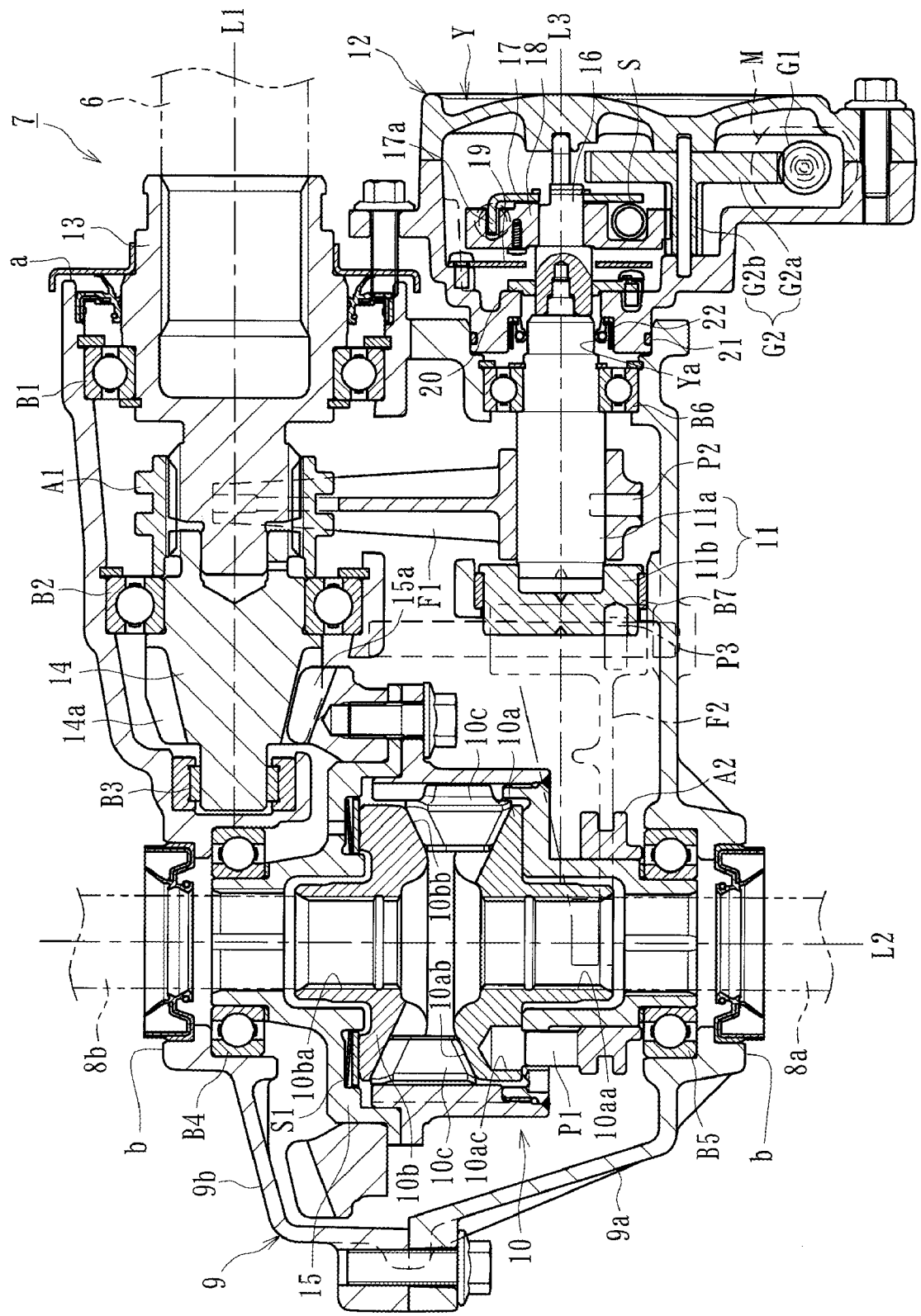

[Fig. 5]
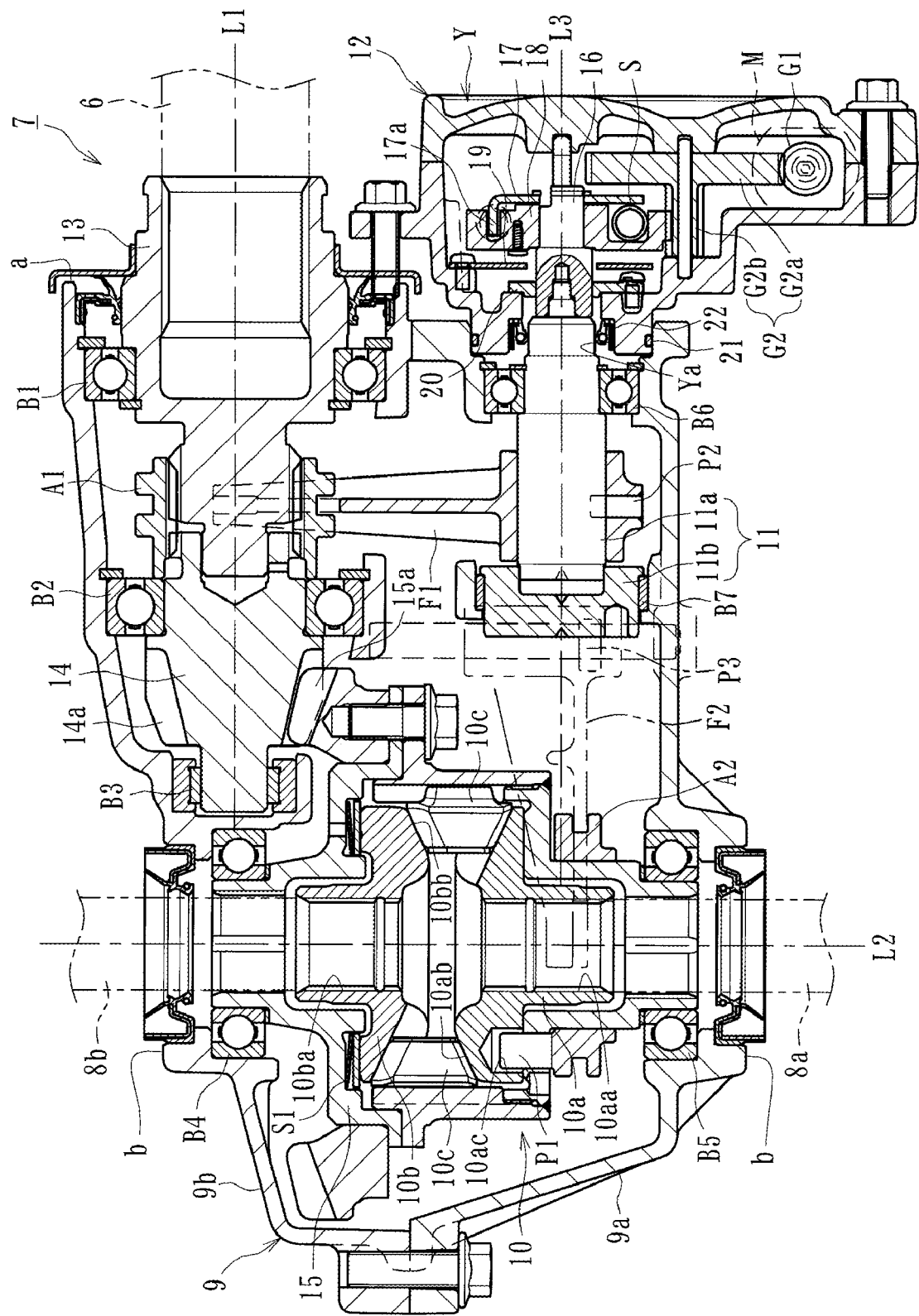

[Fig. 6]
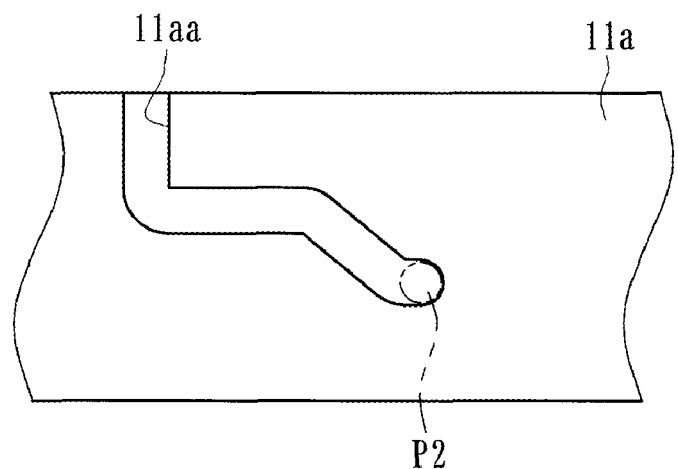
[Fig. 7]
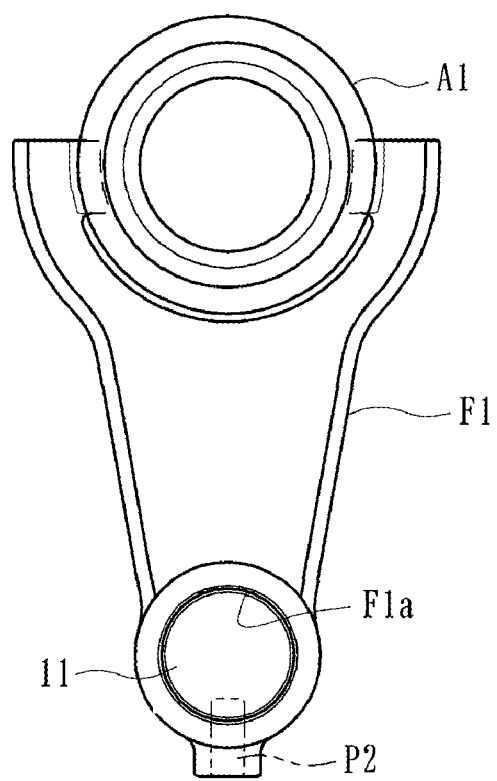

[Fig. 8]
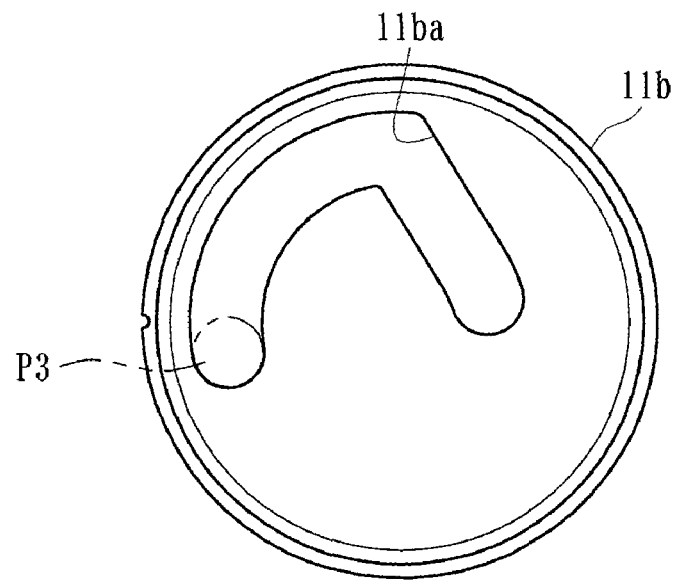
[Fig. 9]
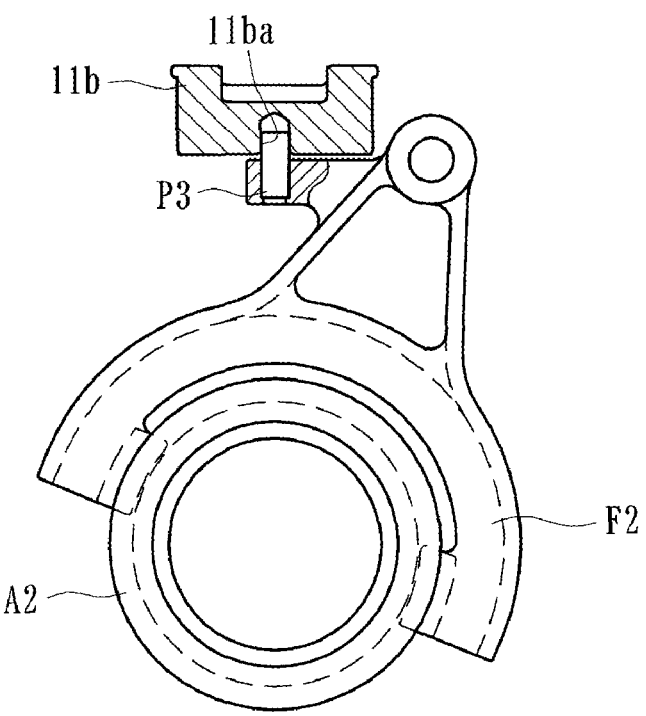

[Fig. 10]
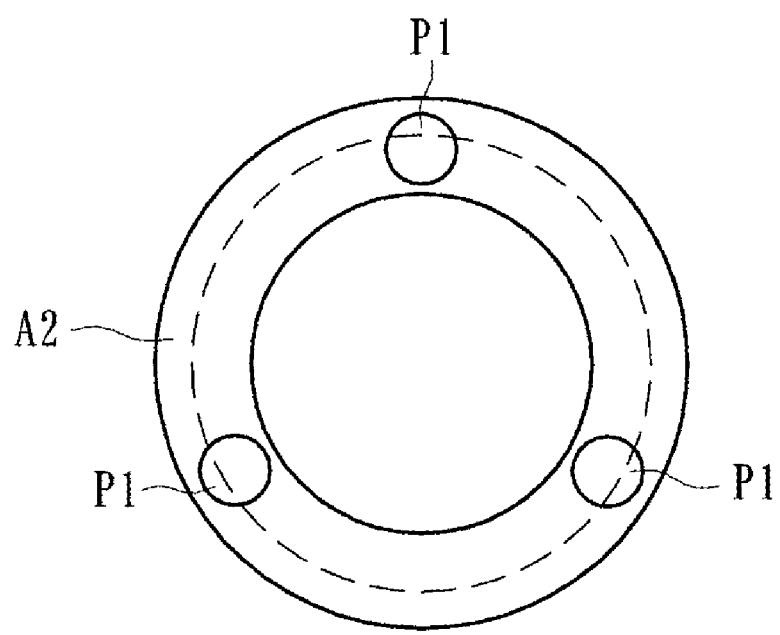

[Fig. 11]
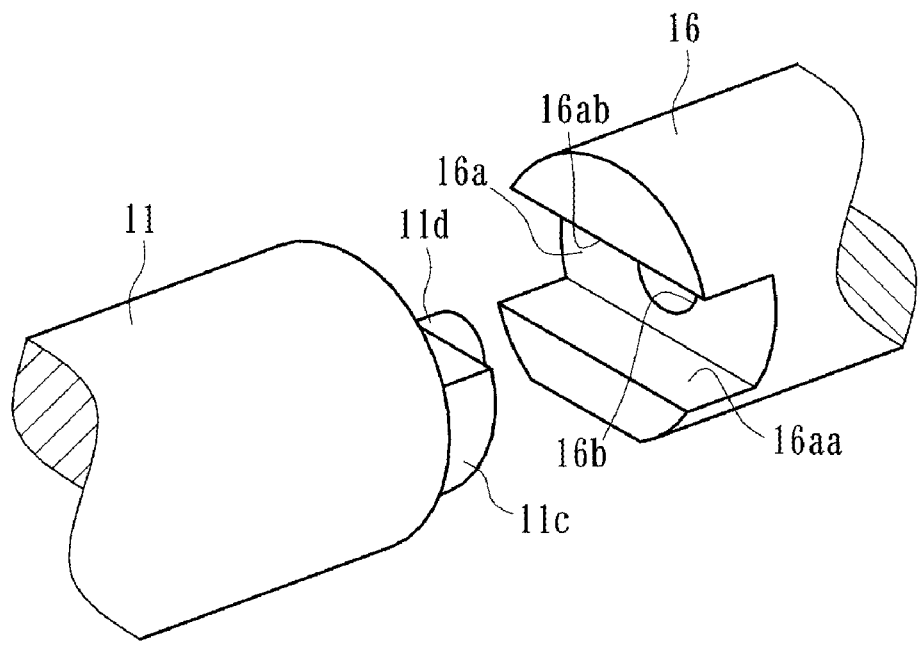
[Fig. 12]
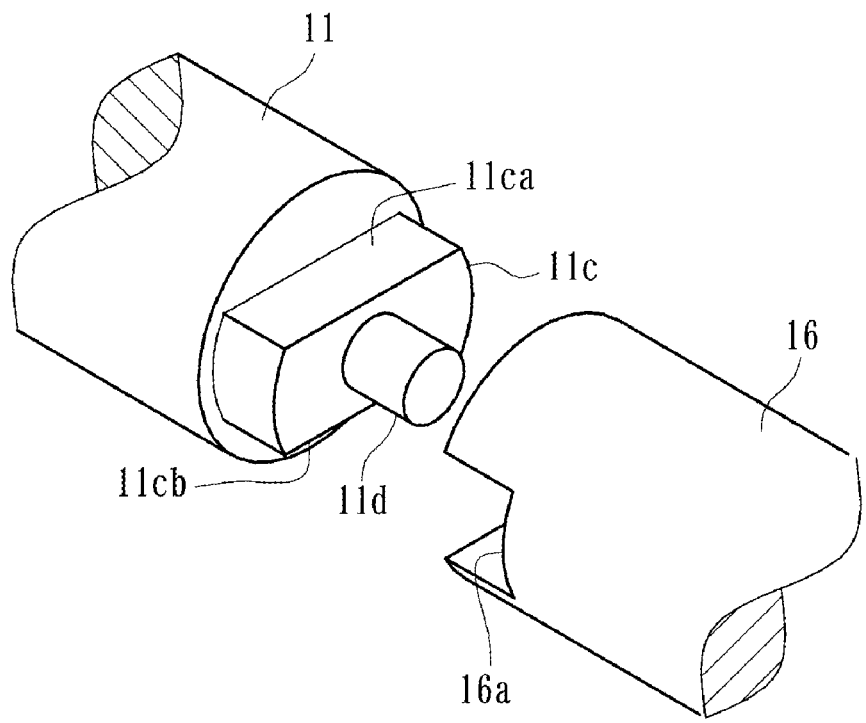

[Fig. 13]
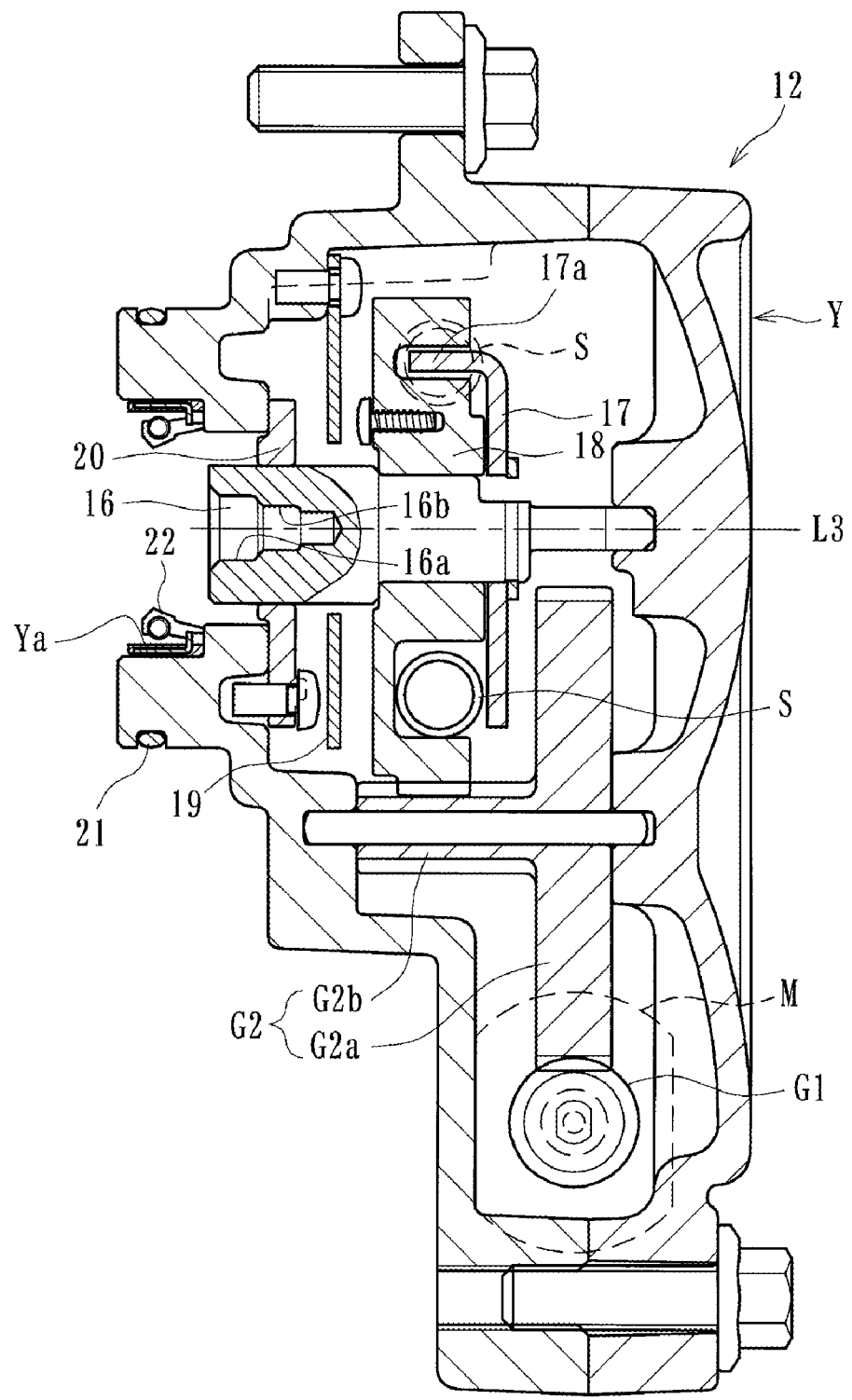

[Fig. 14]
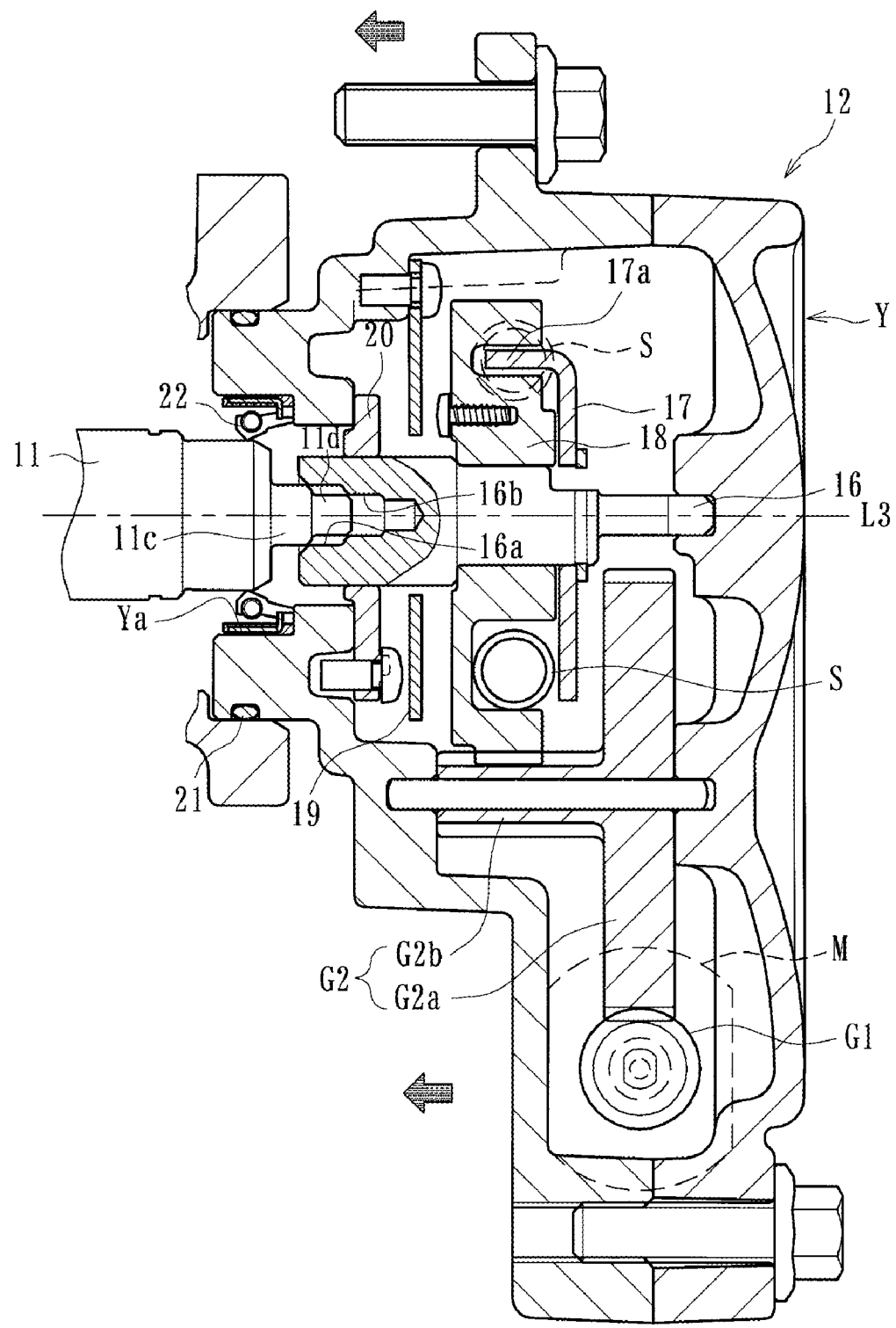

POWER TRANSMITTING APPARATUS

PRIORITY INFORMATION

This application is based on and claims priority under 35 U.S.C. §119 to Japanese Patent Application No. 2007-125358, filed on May 10, 2007, the entire contents of which is hereby expressly incorporated by reference herein.

BACKGROUND OF THE INVENTIONS

1. Field of the Inventions

The present inventions relate to power transmitting apparatuses for switching between 2-wheel and 4-wheel modes and locking and unlocking differential devices.

2. Description of the Related Art

Four-wheel buggies, also known as "ATVs" (All Terrain Vehicles), usually include power transmitting apparatuses for connecting and disconnecting power from an engine to the front wheels, which are not-driven wheels, and also switching between 2-wheel and 4-wheel drive modes. Such a vehicle is disclosed in Japanese Laid-open Patent Publication No. 191768/2003.

Generally, the power transmitting apparatus is provided with a differential means (differential gear set) to provide smooth turning of vehicle by absorbing the difference of rotation between left and right wheels. Japanese Laid-open Patent Publication No. 509409/1994 discloses another type of differential system that does not a differential gear set.

Some known designs can limit the differential action of one wheel by incorporating a power transmitting apparatus provided with means for locking the differential means (differential-locking means) in order to prevent a reduction of driving torque under circumstances in which one of left and right wheels of vehicle would be mired in a slippery road such as mud. A more recently proposed design of a power transmitting apparatus include a motor for connecting and disconnecting the driving force and locking and unlocking of a differential means.

For example, one prior art power transmitting apparatus includes an electric motor arranged in either of the left or right sides of a case forming a box of the power transmitting apparatus. The connection and disconnection between an input shaft connected to an engine and an output shaft connected to a front wheel as well as the locking and unlocking of a differential means are performed by actuating a fork connected to an actuator driven by the electric motor.

Japanese Laid-open Patent Publication No. 324719/2005 discloses a driving device for actuating a fork that connects and disconnects or that performs locking and unlocking of the operating device. In this system, the driving shaft engaged by the operating device for actuating the fork, is projected from a sub case (containing case). In addition the sub case, which forms a case for the driving means, is sealed and structured so that the driving force of the motor can be transmitted to the operational means via the driving shaft by engaging the operational means with an end of the driving shaft projected from the sub case.

SUMMARY OF THE INVENTIONS

An aspect of at least one of the embodiments disclose herein includes the realization that there is a problem in the power transmitting apparatus of the prior art that it is difficult to assemble the driving shaft to the sub case since the sub case is hermetically sealed when the driving shaft is assembled to the sub case. That is, although it is necessary to hermetically close the sub case by forming a seal between the driving shaft and an opening of the sub case when the driving shaft is inserted through the opening and assembled to the sub case, a repulsion force acting on the driving shaft makes assembly of the driving shaft difficult.

One solution to this problem can be to form an aperture in the sub case to prevent formation of hermetic sealing of the sub case and thus action of the repulsion force on the driving shaft and finally to fill the aperture e.g. by screw etc. However this increases the number of parts and reduces the workability of assembly.

Thus, in accordance with an embodiment, a power transmitting apparatus for performing switching between 2-wheel and 4-wheel drive modes and locking and unlocking a differential mechanism by an operational shaft can comprise an input shaft connected to an engine of a vehicle and rotated around a rotational axis. Left and right side output shafts can be configured to drive front wheels or rear wheels of the vehicle when driving force is transmitted from the input shaft. A differential mechanism can be arranged between the input shaft and the output shafts configured to absorb the difference of rotation between the output shafts by differential action thereof. The operational shaft can be configured to connect and disconnect the input shaft from the output shafts by connecting and disconnecting the input shaft and the output shafts and also configured to lock and unlock the differential mechanism. A driving device can be configured to drive the operational shaft. A main case can be mounted on a vehicle and containing the differential mechanism and the operational shaft therein. The driving device can comprise a reversible motor, a driving shaft rotationally driven by the motor and adapted to be engaged by the operational shaft for transmitting a rotational force therebetween, and a sub case containing the motor and the driving shaft therein and mounted on the main case. An opening can be formed in the sub case and can have a size permitting the operational shaft to be inserted and an end face of the driving shaft configured to engage an end face of the operational shaft to be exposed. A first sealing means can be arranged on the inner circumferential surface of the opening at a position away from the driving shaft for sealing off the inside of the sub case by forming a seal between the inner circumferential surface of the opening and the outer circumferential surface of the operational shaft when the operational shaft is engaged with the driving shaft.

Additionally, in accordance with an embodiment, a power transmitting apparatus for performing switching between 2-wheel and 4-wheel drive modes and locking and unlocking a differential mechanism by an operational shaft can comprise an input shaft connected to an engine of a vehicle and rotated around a rotational axis. Left and right side output shafts can be configured to drive front wheels or rear wheels of the vehicle when driving force is transmitted from the input shaft. A differential mechanism can be arranged between the input shaft and the output shafts and can be configured to absorb the difference of rotation between the output shafts by differential action thereof. The operational shaft can be configured to connect and disconnect the input shaft from the output shafts by connecting and disconnecting the input shaft and the output shafts and also configured to lock and unlock the differential mechanism. A driving device can be configured to drive the operational shaft. A main case can be mounted on a vehicle and can contain the differential mechanism and the operational shaft therein. The driving means can comprise a reversible motor, a driving shaft rotationally driven by the motor and adapted to be engaged by the operational shaft for transmitting a rotational force therebetween, and a sub case containing the motor and the driving shaft therein and mounted on the main case. An opening can be formed in the sub case and can have a size permitting the operational shaft to be inserted and an end face of the driving shaft configured to engage an end face of the operational shaft to be exposed. A first seal can be arranged on the inner circumferential surface of the opening at a position away from the driving shaft and can be configured to seal off the inside of the sub case by forming a seal between the inner circumferential surface of the opening and the outer circumferential surface of the operational shaft when the operational shaft is engaged with the driving shaft.

BRIEF DESCRIPTION OF THE DRAWINGS

Additional advantages and features of the present inventions are apparent from the below description and the appended claims, taken in conjunction with the accompanying drawings, wherein:

FIG. 1 is a schematic view showing a vehicle to which various embodiments of the power transmitting apparatus disclosed herein can be applied;

FIG. 2 is a cross-sectional view showing the power transmitting apparatus in accordance with an embodiment;

FIG. 3 is a schematic view showing the inside structure of a driving device of the power transmitting apparatus;

FIG. 4 is a cross-sectional view showing the power transmitting apparatus in a condition switched to the 4-wheel driving;

FIG. 5 is a cross-sectional view showing the power transmitting apparatus in a locked condition of the differential apparatus;

FIG. 6 is a development of the operational shaft showing the side face cam groove of the power transmitting apparatus;

FIG. 7 is a schematic view showing the fork actuated along the side face cam groove of the power transmitting apparatus;

FIG. 8 is an end view of the operational shaft showing the end face cam groove of the power transmitting apparatus;

FIG. 9 is a schematic view showing the fork actuated along the end face cam groove of the power transmitting apparatus;

FIG. 10 is a schematic view showing the sleeve engaging the fork actuated along the end face cam groove;

FIG. 11 is a perspective view of engaging end faces of the operational shaft and the driving shaft taken from one direction thereof;

FIG. 12 is a perspective view of engaging end faces of the operational shaft and the driving shaft taken from the other direction thereof;

FIG. 13 is an enlarged cross-sectional view showing only the driving device of the power transmitting apparatus; and FIG. 14 is an enlarged cross-sectional view showing an assembling process of the driving shaft to the main case of the power transmitting apparatus.

DETAILED DESCRIPTION OF THE PREFERRED EMBODIMENT

As shown in FIG. 1 a power transmitting apparatus cane be mounted between front wheels 2a and 2b in a front region of a vehicle such as a 4-wheel buggy or an ATV (All Terrain Vehicle) for performing the switching between 2-wheel and 4-wheel drive modes as well as locking and unlocking of a differential device. The power transmitting apparatus is disclosed in the context of an ATV because it has particular utility in this context. However, the power transmitting apparatus can be used in other contexts, such as, for example, but without limitation, other vehicles including land vehicles.

As shown in FIG. 1 a propulsion shaft 4 extends from an engine (driving power source) "E" toward the rear of a vehicle to drive rear wheels 3a and 3b respectively via driving shafts 5a and 5b. Another propulsion shaft 6 (input shaft) also extends from the engine "E" and is connected to the power transmitting apparatus 7. These propulsion shafts 4 and 6 are connected to the engine "E" to be rotated around their axes.

A pair of left and right driving shafts (output shafts) 8a and 8b are connected to left and right sides "b" of the power transmitting apparatus 7 and drive the front wheels 2a and 2b of the vehicle 1 when driving force of the propulsion shaft 6 is transmitted to the power transmitting apparatus. That is, when the vehicle 1 is in the 4-wheel drive mode, since the driving force of engine "E" inputted to the power transmitting apparatus 7 is transmitted to the front wheels 2a and 2b via the driving shafts 8a and 8b, the front wheels 2a and 2b are also rotated in addition to the rear wheels 3a and 3b. On the other hand, when the vehicle 1 is in the 2-wheel drive mode, the driving force of the engine "E" inputted to the power transmitting apparatus 7 is not transmitted to the driving shafts 8a and 8b and thus the front wheels 2a and 2b not-driven wheels as described in more detail below.

As shown in FIGS. 2, 4 and 5, the power transmitting apparatus 7 can have a main case 9 formed by two halves (a first case 9b and a second case 9a) for containing therein a driving member 13, a driven member 14, a differential mechanism (or "differential device") 10, and an operational shaft 11 etc. In some embodiments, the driving shaft 8a can extend from a side "b" of the second case 9a, and the driving shaft 8b can extend from a side "b" of the first case 9b. The propulsion shaft 6 can extend from a rear side "a" of the first case 9b facing to the engine "E".

The driving member 13 can be rotationally supported by a bearing B1 and connected to the propulsion shaft 6 via a spline fitting and thus can be rotated together with the propulsion shaft 6 around an axis L1. The driven member 14 can be rotationally supported by bearings B2 and B3 and connected to the driving member 13 via a sleeve A1 (described below) and thus rotated around the axis L1 when the rotational driving force is transmitted thereto.

Teeth 14a forming a gear, can be formed on a circumferential surface of the driven member 14 and mesh with teeth 15a of the housing 15 of the differential mechanism 10. Accordingly, the housing 15 is rotated via meshing of teeth 14a and 15a when the driven member 14 is rotated.

Differential mechanisms, such as the differential mechanism 10, are well-known to provide smooth turning of the vehicle 1 by absorbing the difference of rotation between the driving shafts 8a and 8b due to differential of output cam member 10a and 10b interposed between the propulsion shaft 6 and the driving shafts 8a and 8b. For example, similarly to that disclosed in the Japanese Laid-open Patent Publication No. 509409/1994, the pair of output cam members 10a and 10b having splines 10aa and 10ba for receiving splines of the driving shafts 8a and 8b are contained within the housing 15 and arranged so that they can rotate relative to the housing 15 around an axis L2.

The output cam members 10a and 10b are formed with wave shaped cam surfaces 10ab and 10bb respectively. The cam surface 10ab is formed for example by an annular zigzagged surface comprising six pairs of mutually inclined helical surfaces and the cam surface 10bb is formed by six pairs of mutually inclined helical surfaces corresponding to the cam surface 10ab. A plurality of cam followers 10c are arranged between these cam surfaces 10ab and 10bb. A reference numeral SI in drawings denotes a leaf spring configured to bias the output cam member 10b toward the cam member 10a.

During operation of the vehicle 1 on a straight way, the cam followers 10c apply load to the cam surfaces 10ab and 10bb so as to rotate the cam members 10a and 10b at same speed as that of the housing 15. On the other hand, during operation of the vehicle 1 through a curve, a difference is caused in rotational speed between the cam members 10a and 10b due to the difference of numbers of the cam surfaces 10ab and 10bb of the output cam members 10a and 10b. That is, during turning of the vehicle 1, the output cam members 10a and 10b rotate at different speeds relative to the housing 15 and thus absorb the difference of the number of rotation between the driving shafts 8a and 8b (i.e. difference of rotational speed between the inner wheel and the outer wheel of the front wheels 2a and 2b).

The operational shaft 11 can have one function of connection and disconnection between the propulsion shaft (input shaft) 6 and driving shafts (output shafts) 8a and 8b and thus connection and disconnection of the transmission of rotational force of the propulsion shaft 6 to the driving shafts 8a and 8b, and another function of locking and unlocking of the differential action of the differential mechanism 10 (differential-locking operation). That is, the operational shaft 11 rotates around the axis L3 and can perform the connection and disconnection between the input shaft 6 and output shafts 8a and 8b as well as the differential-locking operation of the differential mechanism 10.

The operational shaft 11 can comprise a smaller diameter portion 11a and a larger diameter portion 11b mounted on one end of the smaller diameter portion 11a and the smaller diameter portion 11a is rotationally supported by a bearing B6 and the larger diameter portion 11b is rotationally supported by a bush B7. The smaller diameter portion 11a and the larger diameter portion 11b can be simultaneously rotated around the axis L3 when they are driven by a differential device 10 (described below). That is, both ends of the operational shaft 11 are rotationally supported as a whole by the bearing B6 and the bush B7.

As shown in FIG. 6, the side face of the operational shaft 11 (the side face of the smaller diameter portion 11a) is formed with a side face cam groove 11 aa for actuating a first fork F1 and a pin P2 is adapted to be inserted into the side face cam groove 11aa. The base end of the first fork F1 is formed with an aperture F1a for passing the operational shaft 11 (smaller diameter portion 11a) therethrough as shown in FIG. 7. That is, the first fork F1 is straddled on the operational shaft 11 at the base end thereof and the pin P2 is press fitted in the base end of the first fork F1 at the bottom of the aperture F1a so that it is directed to the side face cam groove 11aa.

Accordingly when the operational shaft 11 is rotated, the pin P2 is moved along the side face cam groove 11aa and thus the first fork F1 is moved along the operational shaft 11. The fore end of the first fork F1 is engaged with a sleeve A1 and the sleeve A1 is moved along the driving member 13 toward a spline formed on the driven member 14 and engaged therewith as shown in FIG. 4. Thus the driving member 13 and the driven member 14 are connected each other and accordingly the propulsion shaft 6 and the driving shafts 8a and 8b are also connected. In this condition, the front wheels 2a and 2b function as driven wheels and the vehicle 1 is in a switched condition to the 4-wheel drive mode.

Thereafter when the operational shaft 11 is rotated in a reverse direction, the pin P2 is moved along the side face cam groove 11 aa and accordingly the first fork F1 is guided on the operational shaft 11 and returned to its initial position shown in FIG. 2. Thus the sleeve A1 is also returned its initial position shown in FIG. 2 and the driving member 13 and the driven member 14 are disconnected. Thus the vehicle 1 is now switched again from the 4-wheel to the 2-wheel drive mode.

On the other hand, the end face of the larger diameter portion 11b of the operational shaft 11 is formed with an end face cam groove 11ba for actuating a second fork F2 and a pin P3 is adapted to be inserted therein as shown in FIG. 8. As shown in FIG. 9, the second fork F2 is arranged so that it lies on an extension line of the operational shaft 11 (axis L3). The pin P3 is press fitted in the base end of the second fork F2 and the fore end of the second fork F2 is engaged with a sleeve A2.

Accordingly when the operational shaft 11 is rotated, the pin P3 is moved along the end face cam groove 11ba and thus the second fork F2 is actuated to move the sleeve A2 upward in FIG. 2. The end face cam groove 11ba is structured so that it actuates the second fork F2 after the propulsion shaft 6 and the driving shafts 8a and 8b are connected with the first fork F1 is being actuated due to the rotation of the operational shaft 11.

As shown in FIG. 10, a plurality (three in the illustrated embodiment) of pins P1 are integrally mounted on the sleeve A2 and they are adapted to be inserted in apertures 10ac formed in the output cam member 10a as shown in FIG. 5. When the pins p1 are inserted in the apertures 10ac of the output cam member 10a, the output cam member 10a is connected to the housing 15, thereby locking the differential, also referred to as the "differential-locking condition".

Thereafter, when the operational shaft 11 is rotated in a reverse direction, the pin P3 is moved along the end face cam groove 11ba and accordingly the second fork F2 is returned to its initial position shown in FIG. 2. Thus the sleeve A2 is also returned its initial position shown in FIG. 2 and the pins P1 are pulled out from the apertures 10ac of the output cam member 10a. Thus, the differential is now unlocked, thereby returning the vehicle 1 to the "differential-unlocking condition" permitting the differential action of the differential mechanism 10.

As shown in FIG. 3, the differential mechanism 10 can comprises an electric motor "M", a gear combination formed by a worm gear G1 and a gear G2, a spring "S", a rotational shaft member 16, a rotational member 18 and a sub case "Y" forming a box for containing these structural elements. The motor "M" can rotate its output shaft "Ma" in a reverse direction. The worm gear G1 is connected to the output shaft "Ma" of the motor "M" and rotated by the motor "M".

The gear G2 comprises a larger gear G2a and a smaller gear G2b (FIG. 2). The larger gear G2a mates the worm gear G1 and the smaller gear G2b mates teeth formed on a circumferential surface of the rotational member 18. The rotational member 18 contains therein the spring "S" along its circumferential direction and can rotate around the axis L3 together with the spring "S" interlocking with rotation of the gear G2.

The driving shaft 16 passes through the center of the rotational member 18 and rotated around the axis L3. A connecting member 17 is secured on the end face of the rotational shaft member 16 and a bent portion 17a is formed on the connecting member 17 so that it abuts one end of the spring "S". Accordingly when the rotational member 18 is rotated by the motor "M", its rotational force is transmitted to the connecting member 17 via the spring "S" to rotate the driving shaft 16.

As shown in FIG. 11 the end face of the driving shaft 16 facing to that of the operational shaft 11 for engaging therewith is formed with a "two-sided" (16aa and 16ab) key groove 16a passing through the driving shaft 16 in its diametrical direction and a center aperture 16b formed within the key groove 16a on a central axis of the driving shaft 16. On the contrary, the engaging end face of the operational shaft 11 facing to that of the driving shaft is formed with a key projection 11c complementarily received within the key groove 16a and a center projection also received within the center aperture 16b of the driving shaft 16 as shown in FIG. 12.

It should be understood that the term "two-sided" means two side surfaces apart a predetermined distance and that the key groove 16a is somewhat longer than the key projection 11d. Although it is shown in the illustrated embodiment of FIGS. 11 and 12 that the driving shaft 16 is formed with the key groove 16a and the center aperture 16b and the operational shaft is formed with the key projection 11c and the center projection 11d, it is possible to form the key groove and the center aperture on the operational shat 11 and the key projection and the center projection on the driving shaft 16.

That is, it is possible to form on the end face of the operational shaft 11 facing to that of the operational shaft 16 for engaging therewith is formed with the two-sided key groove passing through the operational shaft 11 in its diametrical direction and the center aperture formed within the key groove on the central axis of the operational shaft 11, and the engaging end face of the driving shaft 16 facing to that of the operational shaft is formed with the key projection complementarily received within the key groove and the center projection also received within the center aperture of the operational shaft 11.

The centering of the driving shaft 16 and the operational shaft 11 can be achieved by aligning the center projection 11d with the center aperture 16b and by rotating the operational shaft 11 relative to the driving shaft 16 so as to aligning the key projection 11c with the key groove 16a. In addition since all the center aperture 16b, center projection 11d, key groove 16a and key projection 11c can be easily machined in the driving shaft 16 and the operational shaft 11 having a small diameter, the centering as well as the engagement between the driving shaft 16 and the operational shaft 11 can be accurately performed.

In some embodiments, the sub case "Y" contains therein structural elements such as the electric motor "M", the driving shaft 16 etc. and is adapted to be mounted on the rear side "a" of the main case 9. The sub case "Y" is formed with an opening "Ya" having a size permitting the end face of the driving shaft 16 engaged with the operational shaft 11 to be exposed and the operational shaft 11 to be inserted therethrough. In addition an oil seal 22 as a first sealing means is arranged on the inner circumferential surface of the opening "Ya" and an O-ring 21 as a second sealing means is arranged on the outer circumferential surface of the opening "Ya" of the sub case "Y".

The oil seal 22 can be arranged on the inner circumferential surface of the opening "Ya" at a position away from the driving shaft 16 and structured to hermetically seal the inside of the sub case "Y" with sealing an interface between the outer circumferential surface of the operational shaft 11 and the inner circumferential surface of the opening "Ya" when the operational shaft 11 is engaged with the driving shaft 16. That is, prior to assembly of the sub case "Y" to the main case 9, the sub case "Y" will not be hermetically sealed since the driving shaft 16 is positioned away from the oil seal 22.

The centering of the driving shaft 16 and the operational shaft 11 can be achieved as shown in FIG. 14 by passing the operational shaft 11 through the opening "Ya", then by aligning the center projection 11d with the center aperture 16b and finally by rotating the operational shaft 11 relative to the driving shaft 16 so as to aligning the key projection 11c with the key groove 16a. Thus the operational shaft 11 is sealed with its outer circumferential surface being contacted by the oil seal 22 and the main case 9 is also sealed with the O-ring 21 being contacted by the main case 9.

Under such an assembled condition when the motor "M" is actuated, the rotational force is transmitted to the driving shaft 16 via the worm gear G1, the gear G2, the rotational member 18, the spring "S" and the connecting member 17 and accordingly the operational shaft 11 engaged by the driving shaft 16 is rotated. A substrate 19 formed on its both sides with conducting patterns is secured on the sub case "Y" and a stay 20 is secured on the driving shaft 16. Contacting members (not shown) are mounted on the rotational member 18 and the stay 20 so that they contact the conducting patterns formed on the substrate 19 to detect a rotational angle of the rotational member 18 (i.e. a rotational angle of the motor side) and a rotational angle of the stay 20 (i.e. rotational angle of the driving shaft 16 and the operational shaft 11) based on electric signals determined by the conducting patterns.

During operation, in order to switch the vehicle 1 from the 2-wheel to the 4-wheel drive mode, the motor "M" is actuated to rotate the operational shaft 11 (the smaller diameter portion 11a and the larger diameter portion 11b) around the axis L3. This causes the fork F1 to be slid along the smaller diameter portion 11a of the operational shaft 11 in order to engage the splines of the sleeve A1 and the driven member 14 each other. When the spline of the sleeve A1 does not align the corresponding spline of the driven member 14, the rotation of the differential device 10 (concretely the rotational member 18) is absorbed due to contraction of the spring "S".

Accordingly the rotation of the operational shaft 11 is stopped until the spline of the sleeve A1 is engaged with the spline of the driven member 14 with continuing the actuation of the motor "M". When the spline of the sleeve A1 is engaged with the corresponding spline of the driven member 14, the spring "S" extends to move the sleeve A1 to the specific position and to fit the splines of the sleeve A1 and the driven member 14 each other. Thus the driving member 13 and the driven member 14 are connected each other. Accordingly the propulsion shaft 6 and the driving shaft 8a and 8b are also connected each other and thus the driving force of the engine "E" is transmitted to both the rear wheels 3a and 3b and the front wheels 2a and 2b (4-wheel driving).

During the operational process mentioned above, the pin P3 is kept in the circular arc portion of the end face cam and thus the second fork F2 is not actuated. If it is desired to lock the differential mechanism 10 (differential-locking), the motor "M" is further rotated to rotate the operational shaft 11 (the smaller diameter portion 11a and the larger diameter portion 11b) around the axis L3. This causes the second fork F2 to be moved along the end face cam groove 11ba of the larger diameter portion 11b. Thus the sleeve A2 is moved upward in FIG. 2 to cause the pins P1 to be inserted into the aperture 10ac of the output cam member 10a. When the pins P1 of the sleeve A2 do not align the aperture 10ac, the rotation of the differential device 10 (concretely the rotational member 18) is absorbed due to contraction of the spring "S".

Accordingly the rotation of the operational shaft 11 is stopped until the pins P1 of the sleeve A2 align the aperture 10ac with continuing the actuation of the motor "M". When the pins P1 are aligned with the corresponding apertures 10ac, the spring "S" extends to move the sleeve A2 to the specific position and to insert the pins P1 into the apertures 10ac. Thus the output cam member 10a and the housing 15 are connected each other and the differential action of the differential mechanism 10 is locked (differential-locking).

When the motor "M" rotates in the reverse direction, the operational shaft 11 is also rotated in the reverse direction around its axis L3. Accordingly the unlocking of the differential mechanism 10 (differential-unlocking) as well as disconnection of the propulsion shaft 6 and the driving shafts 8a and 8b (2-wheel driving) can be performed successively. That is, in accordance with some embodiment of the power transmitting apparatus 7, it is possible to arbitrarily perform the switching between the 2-wheel driving and the 4-wheel driving of the vehicle 1 as well as locking and unlocking of the differential mechanism 10 by the operational shaft 11.

According to some embodiments, the sub case "Y" is not hermetically closed during assembly of the operational shaft 11 to the differential device 10 since the end face of the driving shaft 16 to be engaged with the operational shaft 11 is exposed through the opening "Ya" formed in the sub case "Y" and the operational shaft 11 is inserted therethrough to engage the driving shaft 16. This is achieved without increase of the number of structural elements and accordingly the workability of assembly of the operating shaft 11 and the driving shaft 16 can be improved. In addition the main case 9 and the sub case "Y" can be sealed each other by the O-ring 21 during the assembling process of the operational shaft 111 to the driving shaft 16 with passing the operational shaft 11 through the opening "Ya".

In addition since the first fork F1 is mounted so that its the base end straddles on the operational shaft 11 and guided by the operational shaft 11, it is possibly to surely perform the connection and disconnection between the propulsion shaft (input shaft) 6 and the driving shafts (output shafts) 8a and 8b and thus to eliminate any other guiding means. Thus it is possible to improve the workability of assembly due to reduction of the number of structural parts and also possible to improve the freedom of layout within the main case 9.

The operational shaft 11 is rotationally supported at its both ends and thus has strong strength as compared with that supported by a cantilever structure sufficient to support a load applied via the first fork. Particularly, in accordance with some embodiments, the operational shaft 11 can sufficiently support such a large load that would be caused in the side face cam groove 11aa when the configuration of spline of the sleeve A1 does not align the corresponding spline of the driven member 14.

The present inventions can be applied to any other power transmitting apparatus having outline configurations or additional functions different from those illustrated and described in the present application if the power transmitting apparatus has the driving means comprising a reversible motor; a driving shaft rotationally driven by the motor and adapted to be engaged by the operational shaft for transmitting a rotational force therebetween; a sub case for containing the motor and the driving shaft therein and mounted on the main case; an opening formed in the sub case and having a size permitting the operational shaft to be inserted and an end face of the driving shaft for engaging an end face of the operational shaft to be exposed; and a first sealing means arranged on the inner circumferential surface of the opening at a position away from the driving shaft for sealing off the inside of the sub case with forming a seal between the inner circumferential surface of the opening and the outer circumferential surface of the operational shaft when the operational shaft is engaged with the driving shaft.

Obviously, modifications and alternations will occur to those of ordinary skill in the art upon reading and understanding the preceding detailed description. It is intended that the present inventions be construed as including all such alternations and modifications insofar as they come within the scope of the appended claims or the equivalents thereof. For example the present inventions can be applied to a vehicle in which the driving power of an engine is always transmitted to front wheels and switching between the two-wheel driving and the four-wheel driving can be performed by connecting and disconnecting the power transmission to rear wheels. The oil seal 22 as a first sealing means and the O-ring 21 as a second sealing means are replaced by any other general sealing means. In addition the differential mechanism 10 formed by one pair of output cam members contained within the housing of the illustrated embodiment may be replaced by any other general differential means e.g. using planetary gears.

What is claimed is:

1. A power transmitting apparatus for performing switching between 2-wheel and 4-wheel drive modes and locking and unlocking a differential mechanism by an operational shaft comprising:

an input shaft connected to an engine of a vehicle and rotated around a rotational axis;

left and right side output shafts configured to drive front wheels or rear wheels of the vehicle when driving force is transmitted from the input shaft;

a differential mechanism arranged between the input shaft and the output shafts and configured to absorb the difference of rotation between the output shafts by differential action thereof;

the operational shaft configured to connect and disconnect the input shaft from the output shafts by connecting and disconnecting the input shaft and the output shafts and also configured to lock and unlock the differential mechanism;

a driving device configured to drive the operational shaft; and a main case mounted on a vehicle and containing the differential mechanism and the operational shaft therein, wherein the driving device comprises:

a reversible motor;

a driving shaft rotationally driven by the motor and adapted to be engaged by the operational shaft for transmitting a rotational force therebetween;

a sub case containing the motor and the driving shaft therein and mounted on the main case;

an opening formed in the sub case and having a size permitting the operational shaft to be inserted and an end face of the driving shaft configured to engage an end face of the operational shaft to be exposed; and a first sealing means arranged on the inner circumferential surface of the opening at a position away from the driving shaft for sealing off the inside of the sub case by forming a seal between the inner circumferential surface of the opening and the outer circumferential surface of the operational shaft when the operational shaft is engaged with the driving shaft.

2. A power transmitting apparatus of claim 1 additionally comprising a second sealing means arranged on the outer circumferential surface of the opening for forming a seal between the main case and the sub case when the sub case is mounted on the main case.

3. A power transmitting apparatus of claim 1, wherein the end face of the driving shaft configured to engage the end face of the operational shaft is formed with a two-sided key groove passing through the driving shaft in its diametrical direction as well as a center aperture within the key groove on a central axis of the driving shaft, and wherein the end face of the operational shaft configured to engage the end face of the driving shaft is formed with a key projection complementarily received in the key groove of the driving shaft as well as a center projection formed on a central axis of the operational shaft so as to be complementarily received in the center aperture of the driving shaft.

4. A power transmitting apparatus of claim 2, wherein the end face of the driving shaft configured to engage the end face of the operational shaft is formed with a two-sided key groove passing through the driving shaft in its diametrical direction as well as a center aperture within the key groove on a central axis of the driving shaft, and wherein the end face of the operational shaft configured to engage the end face of the driving shaft is formed with a key projection complementarily received in the key groove of the driving shaft as well as a center projection formed on a central axis of the operational shaft so as to be complementarily received in the center aperture of the driving shaft.

5. A power transmitting apparatus of claim 1, wherein the end face of the operational shaft configured to engage the end face of the driving shaft is formed with a two-sided key groove passing through the operational shaft in its diametrical direction as well as a center aperture formed within the key groove on a central axis of the operational shaft, and wherein the end face of the driving shaft configured to engage the end face of the operational shaft is formed with a key projection complementarily received in the key groove of the operational shaft as well as a center projection formed on a central axis of the driving shaft so as to be complementarily received in the center aperture of the operational shaft.

6. A power transmitting apparatus of claim 2, wherein the end face of the operational shaft configured to engage the end face of the driving shaft is formed with a two-sided key groove passing through the operational shaft in its diametrical direction as well as a center aperture formed within the key groove on a central axis of the operational shaft, and wherein the end face of the driving shaft configured to engage the end face of the operational shaft is formed with a key projection complementarily received in the key groove of the operational shaft as well as a center projection formed on a central axis of the driving shaft so as to be complementarily received in the center aperture of the operational shaft.

7. A power transmitting apparatus for performing switching between 2-wheel and 4-wheel drive modes and locking and unlocking a differential mechanism by an operational shaft comprising:
an input shaft connected to an engine of a vehicle and rotated around a rotational axis;
left and right side output shafts configured to drive front wheels or rear wheels of the vehicle when driving force is transmitted from the input shaft;
a differential mechanism arranged between the input shaft and the output shafts and configured to absorb the difference of rotation between the output shafts by differential action thereof;
the operational shaft configured to connect and disconnect the input shaft from the output shafts by connecting and disconnecting the input shaft and the output shafts and also configured to lock and unlock the differential mechanism;
a driving device configured to drive the operational shaft; and
a main case mounted on a vehicle and containing the differential mechanism and the operational shaft therein, wherein the driving device comprises:
a reversible motor;
a driving shaft rotationally driven by the motor and adapted to be engaged by the operational shaft for transmitting a rotational force therebetween;
a sub case containing the motor and the driving shaft therein and mounted on the main case;
an opening formed in the sub case and having a size permitting the operational shaft to be inserted and an end face of the driving shaft configured to engage an end face of the operational shaft to be exposed; and
a first seal arranged on the inner circumferential surface of the opening at a position away from the driving shaft and configured to seal off the inside of the sub case by forming a seal between the inner circumferential surface of the opening and the outer circumferential surface of the operational shaft when the operational shaft is engaged with the driving shaft.

8. A power transmitting apparatus of claim 7 additionally comprising a second seal arranged on the outer circumferential surface of the opening and configured to form a seal between the main case and the sub case when the sub case is mounted on the main case.

9. A power transmitting apparatus of claim 7, wherein the end face of the driving shaft configured to engage the end face of the operational shaft is formed with a two-sided key groove passing through the driving shaft in its diametrical direction as well as a center aperture within the key groove on a central axis of the driving shaft, and wherein the end face of the operational shaft configured to engage the end face of the driving shaft is formed with a key projection complementarily received in the key groove of the driving shaft as well as a center projection formed on a central axis of the operational shaft so as to be complementarily received in the center aperture of the driving shaft.

10. A power transmitting apparatus of claim 8, wherein the end face of the driving shaft configured to engage the end face of the operational shaft is formed with a two-sided key groove passing through the driving shaft in its diametrical direction as well as a center aperture within the key groove on a central axis of the driving shaft, and wherein the end face of the operational shaft configured to engage the end face of the driving shaft is formed with a key projection complementarily received in the key groove of the driving shaft as well as a center projection formed on a central axis of the operational shaft so as to be complementarily received in the center aperture of the driving shaft.

11. A power transmitting apparatus of claim 7, wherein the end face of the operational shaft configured to engage the end face of the driving shaft is formed with a two-sided key groove passing through the operational shaft in its diametrical direction as well as a center aperture formed within the key groove on a central axis of the operational shaft, and wherein the end face of the driving shaft configured to engage the end face of the operational shaft is formed with a key projection complementarily received in the key groove of the operational shaft as well as a center projection formed on a central axis of the driving shaft so as to be complementarily received in the center aperture of the operational shaft.

12. A power transmitting apparatus of claim 8, wherein the end face of the operational shaft configured to engage the end face of the driving shaft is formed with a two-sided key groove passing through the operational shaft in its diametrical direction as well as a center aperture formed within the key groove on a central axis of the operational shaft, and wherein the end face of the driving shaft configured to engage the end face of the operational shaft is formed with a key projection complementarily received in the key groove of the operational shaft as well as a center projection formed on a central axis of the driving shaft so as to be complementarily received in the center aperture of the operational shaft.

* * * * *